July 17, 1923.
P. H. WIERTZ
1,462,096
MACHINE FOR REMOVING AND CRUSHING ROCK
Filed June 21, 1922  3 Sheets-Sheet 3
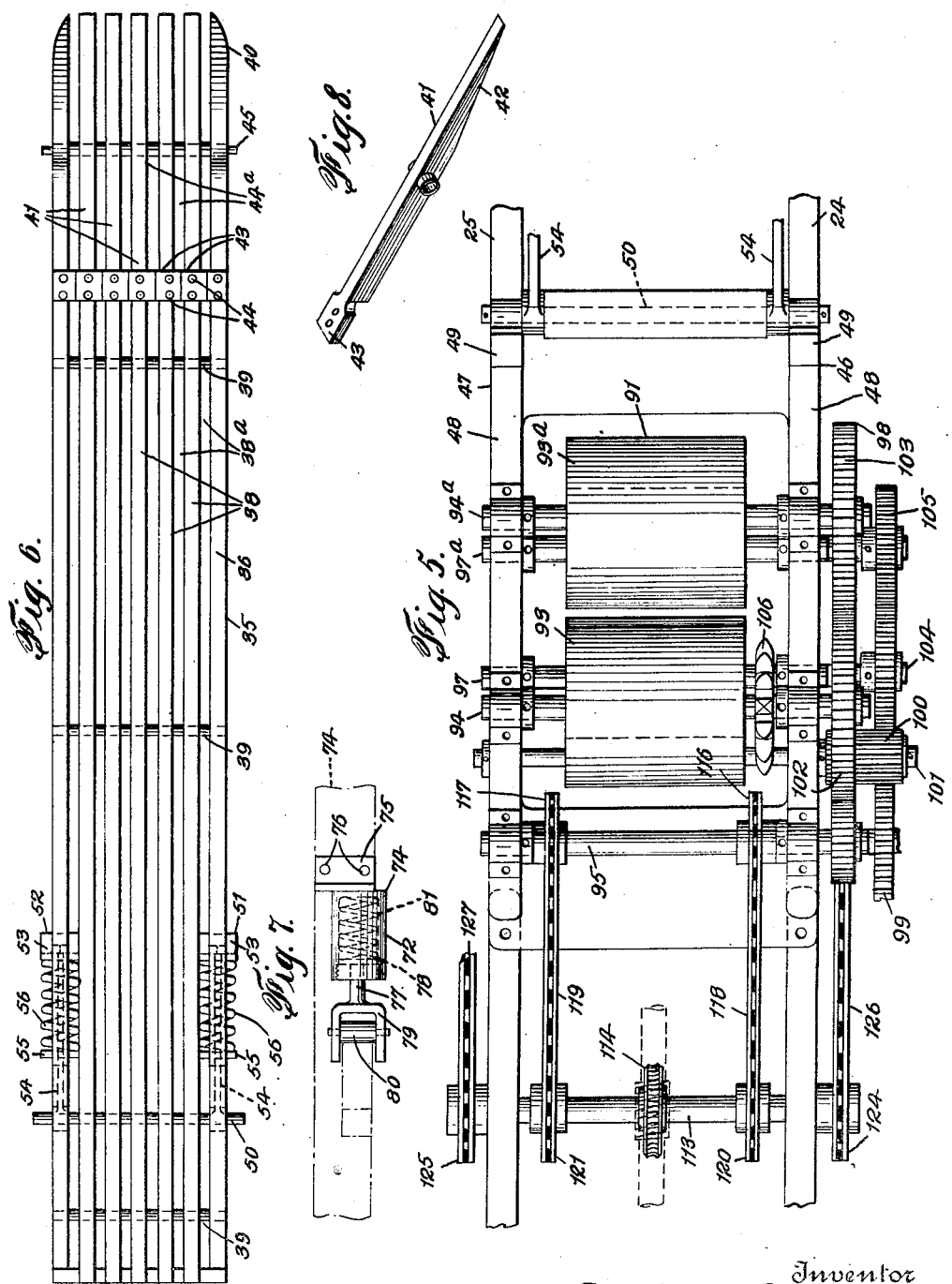

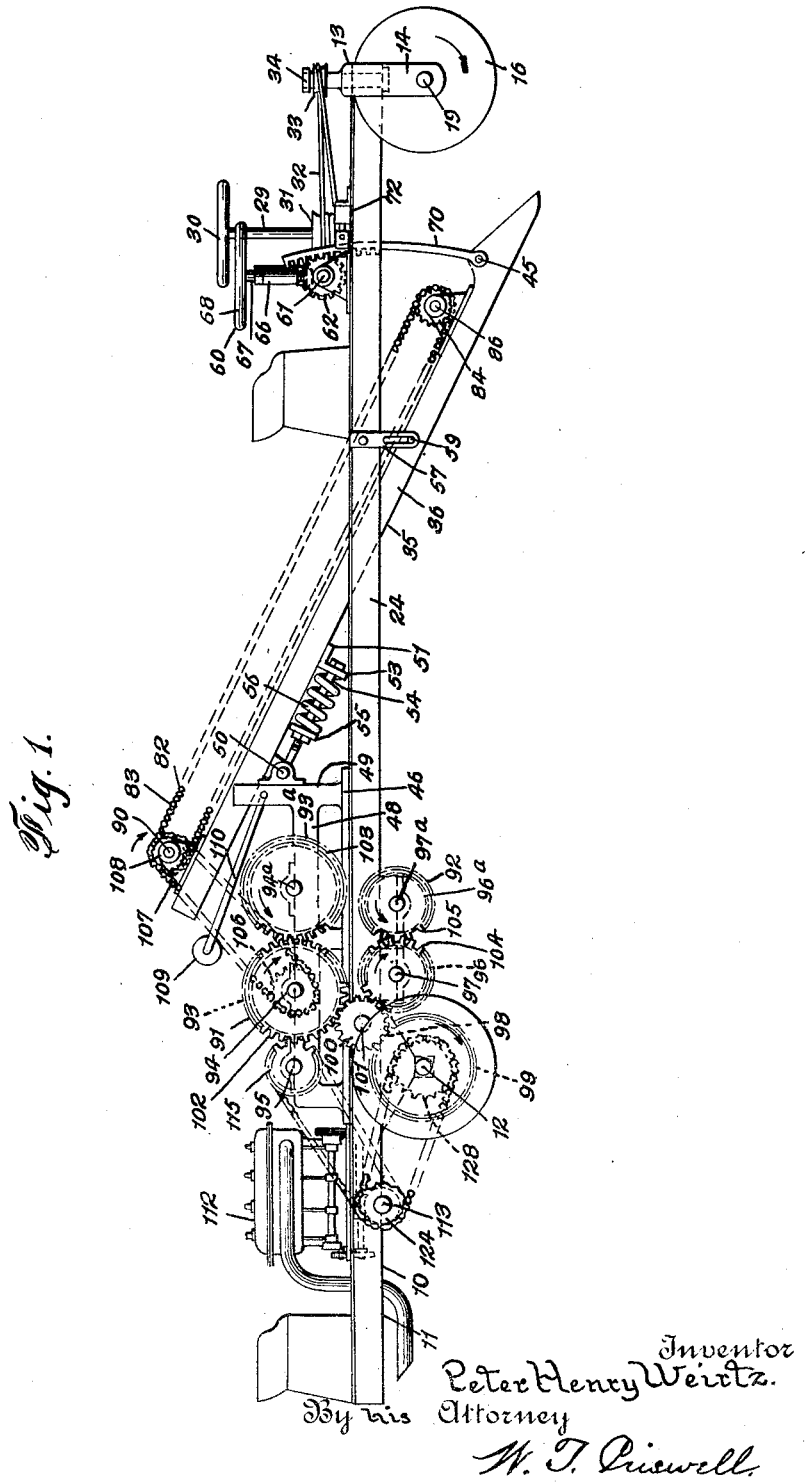

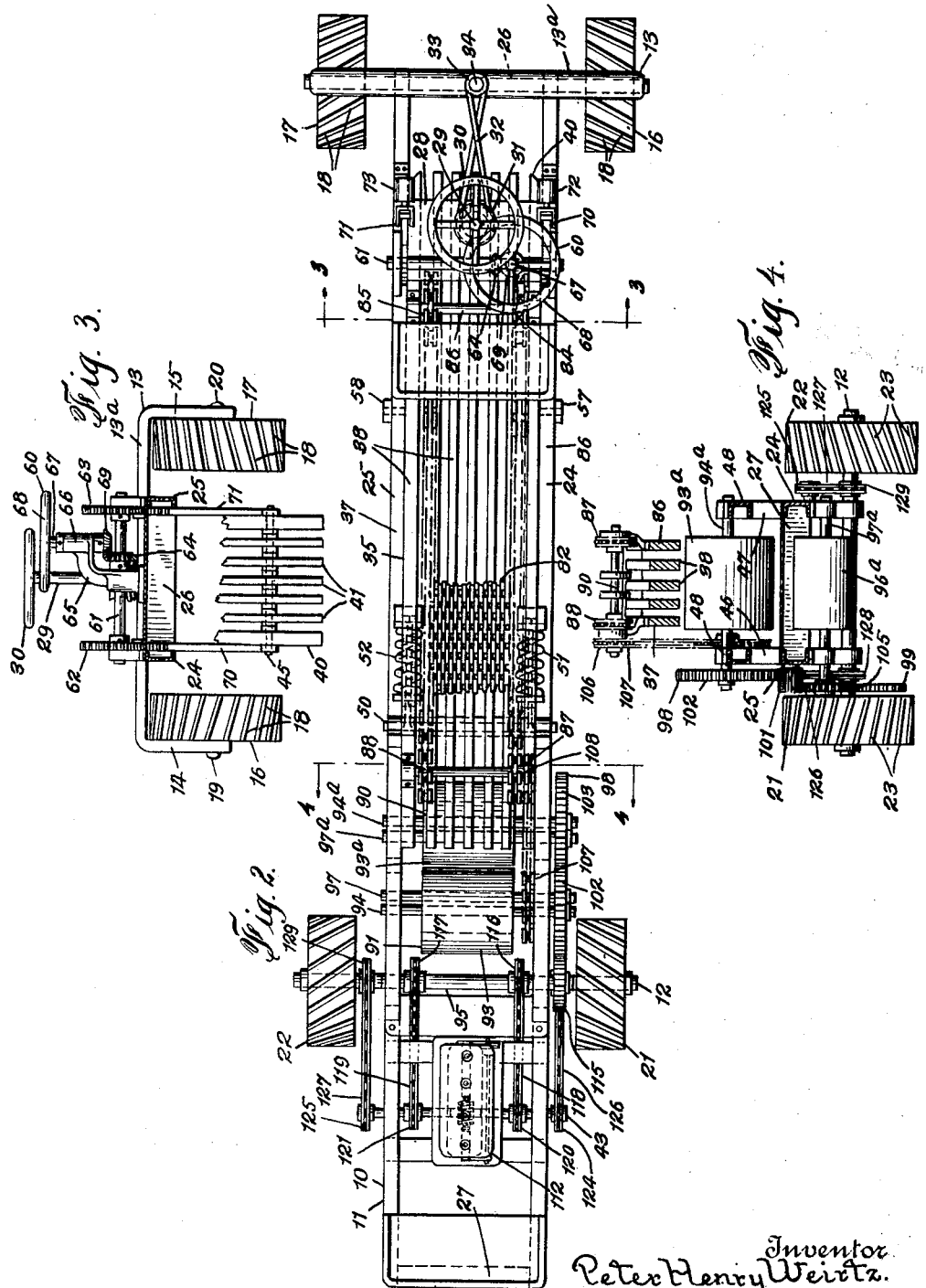

Patented July 17, 1923.

1,462,096

UNITED STATES PATENT OFFICE.

PETER HENRY WIERTZ, OF NEW YORK, N. Y.

MACHINE FOR REMOVING AND CRUSHING ROCK.

Application filed June 21, 1922. Serial No. 569,878.

*To all whom it may concern:*

Be it known that I, PETER HENRY WIERTZ, a citizen of the United States, and a resident of New York, in the county of New York and State of New York, have invented certain new and useful Improvements in a Machine for Removing and Crushing Rock, of which the following is a full, clear, and exact specification.

This invention relates to a class of apparatus adapted to be used for freeing the surface soil of ground of stones.

My invention has for its object primarily to provide a machine of a form adapted to travel on fields and elsewhere for clearing the soil of rock especially when of sizes which are likely to be a hindrance to the proper cultivation of the soil as well as being adapted to be advantageously used for removing and crushing rock during the grading and laying of roads and the like. The invention consists essentially of a vehicle having an open body bed, and protruding on an incline through the bed is an intersticed frame disposed so that its forward end is below and in proximity to the front wheels of the vehicle with its other end disposed above the rear end of the vehicle. An intersticed shovel member is provided on the front end of the frame for shoveling soil and the like when the machine is operated, and both the shovel and frame are movable upwardly and downwardly as well as being yieldingly movable back and forth rearwardly. On the frame is a carrier which is operative for conveying to the rear of the vehicle rock when received on the shovel, and under the rear parts of the frame and carrier are rotatable crushers for crushing the rock conveyed by the carrier.

Other objects of the invention are to provide mechanism operative for raising and lowering the shovel and forward part of the frame at intervals; to provide mechanism which is operative with the driving of the vehicle to operate in unison the crushers and the carrier; and to provide a machine for removing and crushing rock of an efficient and durable construction which may be made in any suitable size.

With these and other objects in view the invention will be hereinafter more fully described with reference to the accompanying drawings forming a part of this specification in which similar characters of reference indicate corresponding part in all the views, and will then be pointed out in the claims at the end of the description.

In the drawings, Figure 1 is a side elevation of one form of machine for removing and crushing rock embodying my invention.

Fig. 2 is a top plan, partly broken away, of the machine.

Fig. 3 is a detail sectional view taken on the line 3—3 of Fig. 2.

Fig. 4 is a detail sectional view taken on the line 4—4 of Fig. 2.

Fig. 5 is an enlarged fragmentary view showing a top plan of two of the crushers of the machine.

Fig. 6 is an enlarged top plan of the movable frame used in the machine.

Fig. 7 is an enlarged fragmentary view showing a plan of one of the buffers used with the mechanism for raising and lowering the shovel and frame of the machine, and Fig. 8 is an enlarged perspective view of one of the spikes or blades used in the shovel of the machine.

The machine is constructed with a vehicle 10 having a body bed 11 which is mounted on a rear axle 12 and on a front bracket or axle 13 which may be substantially the shape of an inverted U to provide a cross bar 13ᵃ with bent ends or arms 14 and 15. The substantially U-shaped bracket 13 is in straddle arrangement over two wheels, as 16 and 17, which may be provided with ribs, as 18, on their peripheries, and these wheels are rotatably mounted on studs 19 and 20, respectively, which are held to the ends of the spaced arms of the bracket. The rear axle 12 is revolvable when the vehicle is travelling, and on the ends of this rear axle are held wheels 21 and 22 also having spaced ribs, as 23, on their peripheries. The bed 11 is preferably substantially rectangular in shape to provide two side bars 24, 25 and end bars 26, 27. The central part of the bed is thereby open. On the side bars 24, 25 of the bed 11, and spaced from the end bar 26 is a platform or plate 28 with an upwardly protruding post 29 having its lower end rotatably mounted in the center of the platform. On top of the post is a steering wheel 30, and on the lower part of the post is a peripherally grooved wheel 31 carrying a twisted belt, as 32, which is also disposed over another pulley 33 held on a post or pivot, as 34, to which is held the central part of the bar 13ᵃ. The lower end of the pivot 34 is revolvably mounted in the end bar 26 of the body bed 11 so that by revolvably moving the wheel 30 the post 29 will be likewise revolved for operating the belt 32 which in turn will rotate the pulley 33 and pivot 34 for shifting the axle bracket 13 and the wheels 16, 17 to steer the machine in the desired direction.

A frame 35 protrudes through the bed 11 on an incline so that its front end is under the bed in proximity to the front wheels of the vehicle with its second end disposed above the bed toward the rear end of the vehicle. The frame 35 is preferably composed of two side bars, as 36 and 37, and between the side bars are spaced bars or slats, as 38, so that the spaces between the bars provided openings or interstices, as 38ª. All of the bars of the frame may be connected by a suitable number of spaced rods or bars, as 39. On the forward end of the frame 35 is a shovel or scoop, as 40, and this shovel may be constructed by forming the side bars 36 and 37 so that their forward ends extend considerable distance beyond the front ends of the slats 38. Between these protruding ends of the side bars of the frame are a number of spaced corresponding spike like blades or bars 41 each having its forward end beveled, at 42, to a cutting or penetrating end, and on the other end of each blade may be a flat head or extension, as 43. The blades 41 are arranged in spaced parallel relation between the extending ends of the side bars 36 and 37 of the frame, and the head 43 of each of the blades is bolted or otherwise fastened, at 44, to each of the bars 38 of the frame. The spaces between the blades 41 of the shovel provide interstices 44ª, and through registered holes in the central part of the blades as well as in the extended ends of the side bars of the frame is held a rod 45 of a length so that its ends protrude beyond the side bars. On the side bars 24, 25 of the bed 11 and above the rear wheels 21 and 22 of the vehicle are two similar brackets, as 46 and 47, each having a longitudinal arm or bar 48 with a bar or standard 49 protruding upwardly at the forward ends of the longitudinal arm. In bearings provided on the standards 49 are journaled the ends of a rod or shaft 50 which is disposed crosswise under the frame 35, and to this rod is mounted the frame by means of buffers, as 51 and 52, to allow the frame to yieldingly move backwardly and forwardly in the bed 11. The buffers 51 and 52 may be similarly formed. Each buffer has a fixed apertured bracket or plate, as 53, and both brackets protrude downwardly from the undersides of the side bars 36 and 37 of the frame in spaced relation to the rod 50. In the aperture of the bracket 53 of each buffer is movably disposed one end of a plunger or rod 54, and the other ends of both of the plungers are rotatably arranged on the rod 50. The rearward part of the plunger 54 of each of the buffers is threaded, and on these threads of each of the plungers is screwed a threaded collar or nut 55 for being adjusted toward and from the bracket 53 of the buffer. Encircling the plunger 54 between the nut 55 and the bracket 53 of each buffer is a spiral spring 56 which is tensioned to normally serve for forcing the frame 35 yieldingly downwardly on the bed 11 so that in event of the shovel 40 contacting with a large rock or other unyielding obstacle in the soil when the vehicle 10 is travelling the shovel and frame will yieldingly move sufficiently to prevent breakage of the parts of the frame and shovel.

The rod 50 also serves as a supporting pivot for the frame 35 and shovel 40 to allow the shovel and forward part of the frame to be raised and lowered toward and from the bed 11 of the vehicle of the machine, and to limit the downward movement of the forward part of the frame and the shovel on the side bars 24 and 25 of the bed are held the upper ends of two downwardly projecting straps, as 57 and 58, each having in its lower end a slot in which is movably disposed a pin 59 projecting from the frame. The frame 35 and shovel 40 may be adjustably raised and lowered by a mechanism, as 60.

The mechanism 60 may be of a suitable form, though the mechanism illustrated has a shaft 61 with its ends journaled in bearings provided on the side bars 24 and 25 of the bed 11 so that the shaft extends across the bed. On the end parts of the shaft 61 between the side bars of the bed are held two toothed wheels 62 and 63, and on the central part of the shaft is held a bevel gear 64. Projecting upwardly from the platfrom 28 of the bed 11 is a bracket 65 having on its upper end a bearing 66 in which is journaled a stud or post 67 with a wheel 68 on its upper end to allow the post to be manually revolved. The lower end of the post 67 extends below the bearing 66 in spaced opposition to the shaft 61, and carried on this post is a bevel gear 69 which is in mesh with the bevel gear 64 of the shaft 61. Meshing with the toothed wheels 62 and 63 are two racks 70 and 71 each of which is in the form of a rod or bar having on its upper portion a row of teeth, and the lower ends of the racks are pivoted to the ends of the rod 45 protruding beyond the side bars of the frame 35. The racks 70 and 71 may be movably held in mesh with the toothed wheels 62 and 63 by buffers 72 and 73. The buffers 72 and 73 may be of similar construction, and each buffer has a casing or cylinder 74 having an open end with a bracket or plate 75 extending from its bottom. The brackets 75 of the cylinders of both of the buffers are bolted or otherwise fastened, as at 76, to the side bars of the frame 35 so that the open ends of the buffers are in spaced opposition to the racks 70 and 71 of the mechanism. Reciprocably movable inwardly and outwardly of the open end of the cylinder 74 of each buffer is a piston or rod 77 having on its end within the cylinder a movable plate 78, and on the other end of the piston 77 of each cylinder is a yoke or pronged head, as 79. Rotatably mounted between the prongs of the head 79 of the piston of each cylinder is a roller 80, and these rollers of both of the buffers 72 and 73 are in rotatable contact with the racks 70 and 71. Within the cylinder of each of the buffers is a spring 81 which encircles the piston 77 having its ends pressing against the bottom of the cylinder and against the plate 78 of the piston, and these springs normally serve to force the plates 78, pistons 77 and rollers 80 in yielding contact with the racks 70 and 71 for movably holding the racks and toothed wheels 62 and 63 in meshing engagement. The shovel 40 and the frame 35 being intersticed the soil which may be received with the rock when the machine is operated, as will be hereinafter more fully explained, will pass through the interstices of the shovel and frame, and the rock will be conveyed upwardly and to the rear end of the frame by a carrier, as 82.

The carrier 82 may be composed of an endless belt 83 made of sprocket links of a width so that it occupies practically the space between the side bars 36 and 37 of the frame 35. The belt 83 is movable over spaced sprockets 84 and 85 which are held on a shaft 86 journaled in bearings provided on the forward part of the frame 35, and the belt is also movable over spaced sprockets 87 and 88 held on a shaft 90 which is journaled in bearings provided on the rear end of the frame. Rock when received on the shovel 40 will be conveyed by the belt 83 of the carrier 82 to the rear of the frame 35, and the rock is then delivered between pairs of crushers, as 91 and 92.

The crushers 91 have closely spaced rollers 93 and 93ª disposed under the rear end of the frame 35 and under the carrier 82 so that rock conveyed by the carrier will be delivered between the rollers. The rollers 93 and 93ª are held on the central parts of shafts 94, 94ª having their ends journaled in bearings provided on the bars 48 of the brackets 46 and 47. One of the ends of both of the shafts 94, 94ª extend beyond the side bar 24 of the body bed 11 of the vehicle 10, and in bearings on the bars 48 of the brackets 46 and 47 is journaled the ends of another shaft 95. The crushers 92 also have closely spaced rollers 96 and 96ª disposed directly under the rollers 93 and 93ª of the crushers 91, and these rollers are held on shafts 97 and 97ª which are journaled in bearings provided on the undersides of the side bars 24 and 25 of the body bed 11 of the vehicle in proximity to the rear wheels 21 and 22 of the vehicle. The rollers 93 and 93ª of the crushers 91 may be larger than the rollers 96 and 96ª of the crusher 92 so that rock of large sizes received between the rollers 93, 93ª may be broken into small pieces, and the small pieces of rock when received between the rollers 96, 96ª may be crushed into small particles. In order to operate the crushers 91 and 92 as well as the carrier 82 in unison I provide a mechanism, as 98.

The mechanism 98 preferably consists of a drive gear 99 which is held on the rear axle 12 of the vehicle 10, and meshing with the gear 99 is a pinion 100 which is held on a shaft 101 journaled in the side bars of the bed 11 of the vehicle. The pinion 100 is in mesh with a gear 102 provided on the shaft 94 of the roller 93 of the crusher 91, and on the shaft 94ª of the roller 93ª of this crusher is another gear 103 in mesh with the gear 102. Also meshing with the pinion 100 is a gear 104 held on the shaft 97 of the roller 96 of the crusher 92, and on the shaft 97ª of the roller 96ª is a gear 105 in mesh with the gear 104. On the shaft 94 of the roller 93 of the crusher 91 is a sprocket, as 106, and passing over this sprocket is a sprocket chain 107 which is also movably disposed over a sprocket 108 held on the shaft 90 of the carrier 82. The sprocket chain 107 may be movably held in engagement with the sprockets 106 and 108 by a roller, as 109, rotatably arranged on a rod bracket 110 which protrudes from the arms or bars 49 of the brackets 46 and 47 of the bed 11.

The machine may be operated by the vehicle 10 being propelled as a trailer or the vehicle may be propelled by an engine, as 112, when suitably arranged on the vehicle. When the vehicle travels over the surface of a field or other plot of ground the shovel 40, frame 35 and the carrier 82 are lowered on an incline so that the shovel will sufficiently penetrate the surface soil by operating the mechanism 60. This is accomplished by rotating the wheel 68 for also rotating the post 67 which will revolve the bevel gears 69, 64 and the shaft 61. The sprockets 62 and 63 will then be revolved to raise or lower the racks 70 and 71 so that the shovel will take up the rock with the surface soil of the ground with the forward travel of the machine. The soil will pass through the interstices of the shovel 40 and of the frame 35, and the rock will be delivered to the rear of the crushers 91 and 92 by the operation of the carrier. The carrier 82 is operated by the mechanism 98 which in turn is operated with the travel of the wheels 21 and 22 and the rear axle 12 of the vehicle. The drive gear 99 of the mechanism will then be driven for revolving the pinion 100. The gears 102, 103 of the crushers 91 and the gears 104, 105 of the crushers 92 will then be driven to revolve the rollers 93, 93$^a$ and 96, 96$^a$ in unison. The sprocket 106, chain 107 and the sprocket 108 will also be driven to rotate the shaft 90 for operating the carrier 82. The rock conveyed by the belt 83 of the carrier will be delivered to the rollers 93, 93$^a$ for being broken into small pieces, and from these rollers the pieces of broken or crushed rock will be delivered to the rollers 96, 96$^a$ for being crushed into small particles. Should the shovel accidentally contact with a large body of rock or other unyielding obstacle damage to the shovel will be largely overcome by the shovel and frame 35 being yieldingly moved in rearward directions so that the force of impact will be absorbed by the buffers 51 and 52. An efficient and durable machine is thus provided for effectually clearing fields and other surfaces of ground of rock. In order to permit the machine to be propelled by the engine 112, a drive shaft 113 is journaled in bearings provided at the rear ends of the side bars 24 and 25 of the bed 11 of the vehicle 10, and on the shaft 113 may be a worm gear 114 adapted to be suitably driven by the engine. Held on the shaft 95 is a gear 115 in mesh with the gear 102 on the shaft 94 of the roller 93, and also on the shaft 95 are two spaced sprocket wheels 116 and 117 over which are passed two sprocket chains 118 and 119. The chains 118 and 119 pass over two sprocket wheels 120 and 121 held on the drive shaft 113, and on this drive shaft are two other sprocket wheels 124 and 125 over which are passed sprocket chains 126 and 127 disposed over sprocket wheels 128 and 129 held on the shaft 12 of the wheels 21 and 22 of the vehicle. When the machine is driven by the engine 112 its power is imparted to the shaft 113 for driving the sprocket wheels 120, 121, 124, 125 and the sprocket chains 118, 119, 126, 127 the sprocket wheels 128, 129 will then be rotated to drive the shaft 12 for propelling the vehicle, and the gear 115 will also be rotated to revolve the gear 102 for operating the crushers 91 and 92 as well as operating the other parts of the machine, as hereinbefore explained.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. In a machine for removing and crushing rock, in combination, a vehicle with operative means for steering the front wheels of the vehicle, a shovel, a carrier operably mounted on top of the vehicle for conveying rock received on the shovel, rotatable crushers under the carrier for receiving and crushing the rock delivered by the carrier, and mechanism operative with the driving of the vehicle to drive the carrier and to rotate the crushers.

2. In a machine for removing and crushing rock, in combination, a vehicle with operative means for steering the front wheels of the vehicle, a shovel movable upwardly and downwardly, operative mechanism for raising and lowering the shovel, a carrier operably mounted on top of the vehicle for conveying rock received on the shovel, rotatable crushers under the carrier for receiving and crushing rock delivered by the carrier, and mechanism operative with the driving of the vehicle to drive the carrier and to rotate the crushers.

3. In a machine for removing and crushing rock, in combination, a bed, a shovel, a carrier operably mounted on top of the bed for conveying to the rear of the bed rock received on the shovel, rotatable crushers under the carrier for receiving and crushing rock delivered by the carrier, and mechanism operative for driving the carrier and to rotate the crushers.

4. In a machine for removing and crushing rock, in combination, a bed, a shovel movable upwardly and downwardly, operative mechanism for raising and lowering the shovel at intervals, a carrier operably mounted on top of the bed for conveying to the rear of the bed rock received on the shovel, rotatable crushers under the carrier, for receiving and crushing rock delivered by the carrier, and mechanism operative for driving the carrier and to rotate the crushers.

This specification signed and witnessed this seventeenth day of June A. D. 1922.

PETER HENRY WIERTZ.

Witnesses:
GEO. BROWN,
JOHN F. CLEARY.